United States Patent Office 3,453,678
Patented July 8, 1969

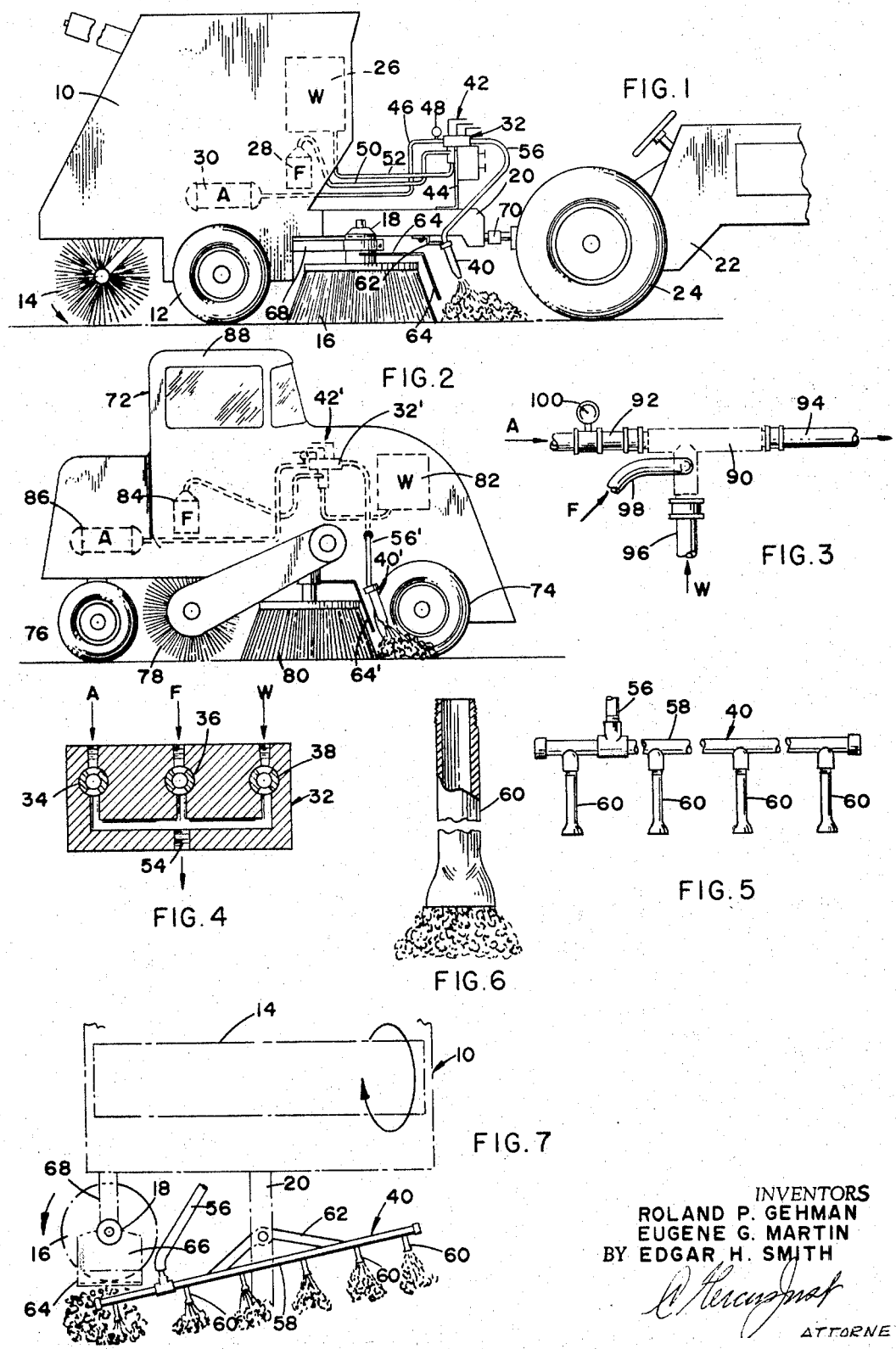

3,453,678
FOAM GENERATING MECHANISM FOR DUST CONTROL
Roland P. Gehman and Eugene G. Martin, Stevens, and Edgar H. Smith, New Holland, Pa., assignors to MGS Incorporated, Denver, Pa., a corporation of Pennsylvania
Filed July 13, 1967, Ser. No. 653,167
Int.Cl. A47l *11/162;* E01h *1/02;* B01j *13/00*
U.S. Cl. 15—50          9 Claims

ABSTRACT OF THE DISCLOSURE

Mobile mechanism having foam generating means associated therewith and arranged to discharge a layer of foam on a dusty surface such as roadways, paved surfaces and floors immediately prior to cleaning the same such as by sweeping with powered means or the like.

Background of the invention

Preventing or minimizing the raising of dust from surfaces on which it has accumulated either during the use of such surfaces by traffic moving thereon or incident to cleaning the same such as by sweeping, has posed problems for a long period of time. The ground surrounding a construction job, until suitably conditioned at the completion of the building such as by planting or hard-surfacing the same usually presents one of two difficulties; in wet weather it is muddy and in dry weather it is dusty, especially when trucks, tractors and other machines move over the surfaces. Dirt roads offer the same difficulties. Paved roadways and streets, parking lots and warehouse or large garage floor surfaces often require cleaning to remove accumulated dust and dirt which is accomplished by power-driven sweeping machines. Particularly during dry and windy occasions, such sweeping raises much of the dust into the atmosphere.

Various attempts have been made to minimize and control the raising of such dust. Oiling or wetting-down such dirt surfaces with water offers limited but very temporary relief or assistance.

The utilization of suction to control dust while areas are being swept, for example, merely postpones the dust difficulty to the time when the sweeper is emptied. Removing accumulated dust from the storage bin or hopper in a sweeper under dry conditions not only is extremely dusty but if it occurs when any breeze is present, the accumulated dust is scattered over nearby areas, to the annoyance of all involved. The use of spray water to "lay" the dust to be swept is reasonably satisfactory but, particularly if the dust is relatively thick and is being swept under dry conditions, the application of spray water rarely efficiently controls even as much as 50% of the dust generated by the sweeping brushes.

Summary of the invention

The principal object of the present invention is to provide preferably mobile power-operated mechanism to effectively and inexpensively generate a substantially continuous supply of foam and spread the same in a layer of suitable thickness to cover and adhere to a dusty surface such as a paved or unpaved thoroughfare, parking surface, warehouse, or large garage surface, or construction job site and of adequate durability to trap the dust and prevent any appreciable amount of it from rising into the air such as when traffic is passing over it or when it is being swept. When such foam covered dust is swept into a powered sweeping machine, no additional carrying capacity for the swept material is required and, simultaneously, the foam operates to at least partly wet or moisten the sweepings in a manner which is much more effective than when the dust is sprinkled with a water spray.

The use of foam is superior to a water spray in that substantially the entire area of the dust layer is covered by and thereby trapped beneath a substantially continuous layer of foam which preferably is of a reasonably moist nature. Thus, for example, when this occurs immediately prior to being engaged by the brush of a power sweeper for sweeping the material either into receiving means in the sweeping machine or into a narrow row accumulated in a gutter, or otherwise, in the event the sweeping machines including no collecting mechanism, substantially no dust rises into the atmosphere. Emptying accumulated sweepings of this type from a sweeping machine provided with receiving and storage means for the sweepings also is accompanied by relatively little dust being discharged into the atmosphere and the discharged sweepings are subjected, at most, to only very little spreading if the discharged material happens to be engaged by a breeze or wind.

The invention also provides various types of generating means for producing desired quantities and types of foam, adjustable means for regulating the discharge thereof to surfaces to be covered thereby, including also adjustment to desired locations with respect to the brushes of a sweeping machine in which the invention is employed, and conveniently arranged control mechanism is readily operated by the operator of the mechanism by which the foam is spread.

To simplify the description of the invention, its application to a power-operated sweeper has been selected as a suitable means to describe and illustrate the details and function of the invention.

Description of the drawings

FIG. 1 is a side elevation of one embodiment of power type sweeper arranged to be drawn along a surface to be swept by a fragmentarily illustrated tractor and provided with one type of foam generating means embodying the principles of the invention.

FIG. 2 is a side elevation of another embodiment of power type sweeper having foam generating means adapted particularly for the type of sweeper illustrated in said figure.

FIG. 3 is a fragmentary, somewhat diagrammatic arrangement of foam generating and distributing elements per se embodying the invention.

FIG. 4 is a sectional plan view of another embodiment of foam generating mechanism employing a plurality of mixing valves communicating with a common discharge.

FIG. 5 is a foreshortened elevation of an exemplary elongated arrangement of a plurality of foam discharging nozzles.

FIG. 6 is an enlarged, partly sectioned and foreshortened elevation of single nozzle type illustrated in FIG. 5.

FIG. 7 is a fragmentary, exemplary plan view of the brush arrangement of sweepers illustrated in the embodiment of FIG. 1 in association with a foam distributor of the type shown in FIG. 5.

Figure 8:
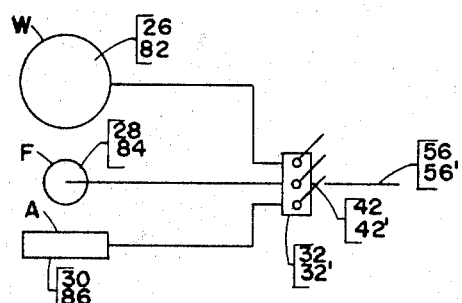
FIG. 8 is a diagrammatic arrangement of one embodiment of supply and mixing means for producing foam according to the invention.

*Description of the preferred embodiments of the invention*

Referring to FIG. 1, there is illustrated therein an embodiment of mobile machine which embodies one type of foam generating and discharging mechanism which comprises, for purposes of ready illustration, a power type sweeper 10 supported by a pair of wheels 12. The machine includes an elongated rear brush 14 which extends transversely between the opposite sides of the sweeper 10 and is rotated in the direction of the arrow to sweep dirt toward the center of the sweeper 10 for delivery thereof to receptacle means of suitable type within the body of the sweeper 10, such receiving means not being illustrated in detail, but one example of which is shown in U.S. Patent No. 3,186,016.

Mounted adjacent one side of the sweeper 10, particularly for purposes of sweeping the accumulations in a gutter, for example, is a supplementary brush 16 which is rotatable about a substantially vertical axis by power means 18, in contrast to the rotation of brush 14 about a substantially horizontal axis by power means within the sweeper 10, but not illustrated in detail. Extending forwardly from the sweeper 10 is a tongue 20 by means of which the sweeper 10 is pulled by any suitable power means such as a tractor 22 upon which an operator may be seated between the driving wheels 24 at the rear of the tractor.

In this embodiment of machine, it is contemplated that the frame thereof shall support, at a suitable location, a water reservoir 26 having an appropriate capacity to permit the foam generating mechanism of the machine to operate preferably for at least a few hours. Another reservoir 28 arranged to contain a foam concentrate of suitable type also is mounted suitably within the body of the machine. Further, the machine also may contain a compressed air tank 30 and/or air compressor, not shown, in accordance with one embodiment of the foam generating means which essentially comprises a mixing valve 32, details of one form of which are illustrated in exemplary manner in FIG. 4.

The mixing valve 32 comprises a suitable housing within which a series of adjustable valves 34, 36 and 38 are located, as shown in exemplary manner in FIG. 4 for purposes of controlling the type and consistency of foam which is to be discharged from nozzle means 40 either forwardly of the supplementary brush 16 or rear brush 14, or both.

As shown in FIG. 4, the valves 34, 36 and 38 may be of a relatively simple nature, such as rotatable plug valves respectively operated by handles 42 which, as shown in FIG. 1, are located conveniently for ready engagement by an operator when seated upon the tractor 22. For convenience, for example, the mixing valve 32 may be supported by a suitable bracket 44 adjacent the forward end of tongue 20 for purposes of effectively supporting the mixing valve 32 at such convenient location for the operator upon the tractor.

By way of example, the valve 34 may be connected to the compressed air tank 30 by means of conduit 46 and the pressure within the line readily may be ascertained by a suitable gauge 48. Valve 36 may be connected by means of conduit 50 to the foam concentrate reservoir 28. By way of further example, the foam concentrate may comprise any of a number of different detergents, liquid soap concentrates, and the like, which presently are commercially available. Valve 38 is connected to the water reservoir 26 by another conduit 52. For certain operations, a certain water pressure, such as 40 p.s.i. may be required. If so, this can be provided by a water pump, not shown, in conduit 52, and driven by suitable power connection from tractor 22, or otherwise.

With all of the essential ingredients for producing satisfactory foam at a steady rate through suitable adjustment of the individual valves 34, 36 and 38, it will be seen that the foam thus generated is delivered through an exit port 54 in mixing valve 32 so as to discharge the same into conduit 56 which communicates with the nozzle means 40 as clearly shown in FIG. 1. The nozzle means 40 may have a discharge end somewhat in the nature of a slot, the nozzle being fan-shaped so as to discharge a somewhat thin but wide stream of foam extending substantially transversely to the axis of the tongue 20 for example.

In the event it is found that a single nozzle is inadequate to provide the desired volume of foam and particularly the required extent or pattern of foam, the composite nozzle arrangement shown in exemplary manner in FIG. 5 may be employed. From this it will be seen that the foam supply conduit 56 communicates with a horizontal pipe 58, for example, which is suitably connected to tongue 20 by an appropriate bracket means, one exemplary type of which is illustrated in FIG. 7. FIG. 7 is a plan view of the type of machine shown in FIG. 1 having a multiple nozzle discharge of the type shown in FIG. 5, whereby the nozzle means 40 has an overall width substantially equal to that of the machine and also the length of the rear, horizontal brush 14 when the machine is a sweeper, while at least the left-hand end of the nozzle means 40, as shown in FIG. 7, is in front of the supplementary brush 16 if provided on the machine.

As shown in somewhat exemplary manner in FIG. 7, the bracket means 62 preferably is pivotally supported by the tongue 20 for purposes of permitting various angular dispositions of the bracket means 40 with respect to the longitudinal axis of tongue 20 for example. Further, the discharge ends of the individual nozzles 60, especially as shown in FIG. 6, are somewhat flattened and fan-shaped so as to individually discharge a somewhat fan-shaped pattern of foam, as shown in exemplary manner in FIGS. 6 and 7. The combined result is a substantially continuous transversely extending stream of foam which is discharged forwardly of the machine. When the machine is a sweeper, the foam discharge mechanism also is forward of both the rear brush 14 and the supplementary brush 16.

Particularly for purposes of preventing the rotatable supplementary brush 16 from disturbing the foam pattern in any way, as well as to prevent the foam from being discharged directly onto brush 16, an appropriate baffle plate 64 of sheet metal or otherwise may be supported by an appropriate bracket 66 which, for example, may be conneted to the power means 18 for the supplementary brush 16. Said power means may be connected by an appropriate sturdy arm 68 to the frame of the sweeper 10, or otherwise.

Power to operate the brushes of the sweeper 10 may be derived, for example, through a P.T.O. connection 70 carried by the tractor 22. If desired, the P.T.O. connection may operate a hydraulic pump, not shown, suitable to provide hydraulic fluid to the power means 18 of brush 16, in which event the power means 18 may comprise a hydraulic motor. Likewise, the rear brush 14 may be driven by a suitable hydraulic motor but, if preferred, the P.T.O. 70 may drive rotatable shafts and other appropriate driving means, not illustrated, which are connected to either or both of the brushes 14 and 16 to operate the same in any conventional manner. Such power means also may be used to drive a conventional air compressor, not shown, which delivers compressed air to the tank 30.

In accordance with another embodiment contemplated by the invention however, the exhaust from the internal combustion engine of the tractor 22 may be substituted for the compressed air furnished by tank 30 inasmuch as such exhaust gas is equally capable of generating foam from the concentrate in reservoir 28 as compressed air from tank 30.

Referring to FIG. 2, a self-propelled type of machine 72 is illustrated somewhat diagrammatically, the same being supported by a pair of front wheels 74 and a swiveled rear wheel 76 by which the machine is steered. At least certain of said wheels are power operated by an appropriate motor, not shown, but carried by the machine. Said machine, when a sweeper, also is provided with a horizontal so-called rear brush 78 and a supplementary brush 80 which is rotatable about a vertical axis, the same corresponding respectively to brushes 14 and 16 in the embodiment shown in FIG. 1. The brushes also are driven by similar mechanism to that described above with respect to the embodiment of FIG. 1.

Machine 72 is provided with a water reservoir 82, a reservoir 84 to contain foam concentrate, and a compressed air tank 86, all of which are connected by appropriate conduits to mixing valve 32' which is similar to the mixing valve 32 shown in FIGS. 1 and 4 and serves a similar purpose when operated by the handles 42' connected respectively to the various control valves therein. Actuation of said valves results in generating a desired texture and consistency of foam which is discharged through conduit 56' to foam discharge nozzle means 40', the same being similar respectively to conduit 56 and nozzle means 40 shown in the above-described embodiment illustrated in FIGS. 1, 5 and 7.

In the embodiment shown in FIG. 2, it will be seen that the operator will be seated within a cab 88, whereby the valve control handles 42' will be within ready access for easy manipulation to control the generation of foam which is discharged through the nozzle means 40' while the operator also is capable of otherwise guiding and controlling the operation of the machine 72 which is also provided with appropriate baffle means 64' functioning similar to the baffle 64 shown in FIGS. 1 and 7, especially if the machine is a sweeper.

In lieu of the particular type of mixing valve 32 shown in detail in FIG. 4, if desired, a somewhat different type of mixing arrangement such as illustrated in exemplary manner in FIG. 3 may be employed, in which a mixing T 90 is utilized. Opposite ends of the head of the T 90 respectively are connected to an air or gas line 92 and the foam discharge conduit 94, while the stem of the T 90 is connected to a water conduit 96. Intersecting such stem of the T 90 is another conduit 98 leading from the reservoir for the foam concentrate. A pressure regulator 100 is connected in the air or gas line 92 and preferably includes a visible gage.

Figure 9:
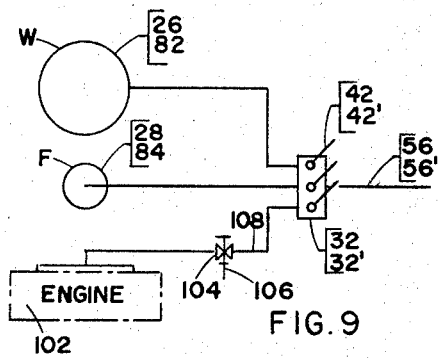
FIG. 9 is a diagrammatic view of still another arrangement of supply and foam generating means from that shown in FIG. 8.

Referring to the diagrammatic arrangement of foam generating means shown respectively in FIGS. 8 and 9, it will be seen that the arrangement of FIG. 8 is incorporated in the embodiments of machines respectively shown in FIGS. 1 and 2. In the arrangement shown in FIG. 8, it is contemplated that air necessary to combine with the water and foam concentrate is furnished by a compressor having a pressure tank associated therewith. Referring to FIG. 9 however, it will be seen that the gas required to generate the foam is supplied by the exhaust from an internal combustion engine 102. Such exhaust preferably is selectively controlled by an appropriate valve 104 having one discharge port 106 leading to atmosphere, and another discharge port which communicates with conduit 108 leading to the mixing valve 32 or 32'.

Figure 10:
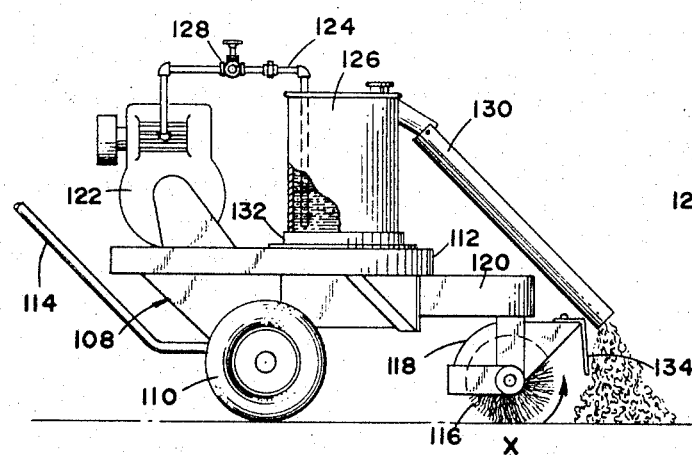
FIG. 10 is a side elevation, partly broken away to show details, of a mobile type mechanism of smaller size than that shown in FIGS. 1 and 2 and intended to be controlled by an operator while walking behind the sweeper as foam is distributed forwardly thereof, said machine also including a rotatable brush thereon.
Figure 12:
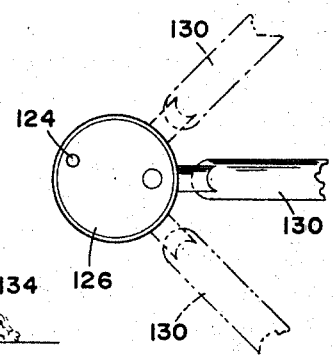
FIG. 12 is a fragmentary plan view showing different adjusted positions of the foam discharge means of the embodiment of sweeper shown in FIGS. 10 and 11, several of the adjusted positions of the discharge means being illustrated in phantom.
Figure 11:
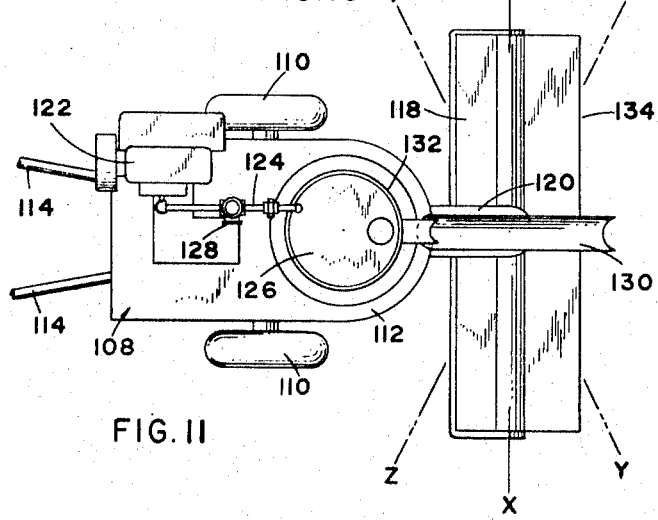
FIG. 11 is a top plan view of the embodiment of mechanism shown in FIG. 10.

Referring to FIGS. 10–12, a generally smaller embodiment of machine 108 is shown which preferably is supported upon a pair of wheels 110 mounted upon a frame 112 from which control handle means 114 extend rearwardly. It is contemplated for example that this embodiment may be operated by an attendant walking in back of the machine 108 and engaging the handle means 114 not only to steer the same but also, when the machine is a sweeper, to vertically control the engagement of the forward rotatable brush 116 thereon, if desired, with the surface to be swept. An embodiment of machine of this type may be used for many purposes where a larger machine of the type shown in FIGS. 1 and 2 would not be suitable. For example, spreading foam upon and/or sweeping the floor of a large building such as a gym, garage, warehouse, or the like, as well as sidewalks, are within the contemplated uses of such smaller type machine.

In the smaller type embodiment of machine referred to above, it is not generally contemplated at least that a receptacle shall be included for purposes of receiving sweepings from the brush 116 if the machine is a sweeper. Rather, it is contemplated that the transversely extending brush 116, which rotates in the direction of the arrow shown in FIG. 10, shall operate within a transversely elongated hood 118. The hood is fixed with respect to the axis about which the brush 116 revolves but the assembly is arranged to be pivoted about a vertical axis extending through the forward end of the arm 120 which projects from the frame 112. Hence, as illustrated diagrammatically in FIG. 11 the brush and hood assembly may be rotated to extend diagonally along the axis y—y or z—z, particularly if it is desired to effect a so-called windrow along one side or the other of the path traversed by the sweeper 108. However, if it is desired to accumulate sweepings at one end or the other of the surface being swept, the brush and hood assembly may be positioned along the axis x—x so as to sweep directly forwardly with respect to the direction of movement of the sweeper 108.

Suitable power means such as internal combustion engine 122, is carried by frame 112 for purposes of driving the wheels 110, if desired, by any suitable transmission means, not shown, as well as rotating the brush 116 in the direction of the arrow, by suitable conventional driving means, not illustrated. Further, the foam to be generated for the machine 108 in accordance with the principles of the invention may be formed by utilizing the exhaust from the engine 122 and conducting the exhaust gases through conduit 124 into a tank 126 in which a mixture of water and foam concentrate is contained. Control valve 128, having a discharge port opening to atmosphere, as well as a discharge port connected to conduit 124 may be employed to regulate the discharge of gas into tank 126, when desired.

Foam generated as the result of discharging gas under pressure into tank 126 is discharged from the upper portion of the tank 126 into a conducting chute 130 which extends forwardly and downwardly, the lower end thereof being forward of the brush 116. Particularly if the foam mixture is so regulated as to be reasonably fluid it will flow transversely sufficiently to extend substantially for the full width of the machine, including brush 116, if used, or the discharge end of chute 130 may be so arranged as to extend adequately in a transverse direction to insure delivery of a stream of foam of suitable width commensurate with the width of the machine and brush 116.

It also is contemplated that the chute 130 may be adjusted angularly with respect to the axis of tank 126 for example, two exemplary adjusted positions being shown in phantom in FIG. 12, while a selected position of the chute 130 is shown in full lines in said figure. One simple but effective method of effecting such adjustment of the position of chute 130 is to mount the tank 120 within a short circular collar 132. The weight of the tank and its contents usually is adequate to maintain any adjusted position of the tank within the collar 132, while such weight is not sufficient to prevent the ready rotation of the tank about its vertical axis to effect any desired position of the chute 130 with respect to the forward end of the machine. Appropriate foam spreading mechanism may be used on the lower end of chute 130, if desired.

As in the preceding embodiments, the machine 108 also is provided with an appropriate, transverse, downwardly extending baffle 134 which prevents the discharging foam from directly contacting the brush 116, when the machine is a sweeper, while the foam is falling to the surface to which it is to be applied and following which the dirt which is entrapped by the layer of foam spread thereover will be engaged by the brush 116.

Foamable material of the type desired to be employed in the various embodiments of machines described hereinabove preferably contains a suitable wetting agent capable of wetting dust sufficiently to render the distributed layer of foam capable of substantial penetration of a layer of dust or dirt over which it is spread. Further, this tends to bind the dust or dirt together, at least to a certain extent. As a result, when the foam apparatus is associated with a rotary sweeping brush of one form or another but especially a horizontal one, there is a tendency for the brush to somewhat roll up the layer of foam and entrap dirt and dust as the sweeper moves over the surface being cleaned, thus not only minimizing any raising of loose dust but enhancing the removal of it from the surface being swept.

From the foregoing, it will be seen that the present invention provides various embodiments of different capacities and arrangements of machines employing foam generating means of appropriate design which are for purposes of spreading a layer of foam on dust or to control rising of dust therefrom such as when the same is to be swept by powered sweepers immediately prior to said dirt being engaged by the brushes of the sweepers. Accordingly, the dirt is sufficiently covered and entrapped by a layer of foam that the mixture of dirt and foam, when engaged by the brushes of the sweepers is adequately moist as to substantially minimize, if not completely prevent, the escape of dust from such sweepings.

The material utilized to generate the foam is relatively inexpensive and the rate of consumption by the foam generating and discharging machines is such as not to noticeably increase the cost of operation of the machine, if a sweeper, over that of operating conventional sweepers presently employing water sprays or suction means, for example, to attempt to control the dust. By way of specific example, without being intended as a limitation on the present invention, it has been found that machines, including sweepers, of the type illustrated in FIGS. 1 and 2 may be operated at a consumption rate of about one-half gallon per hour of foam concentrate, and one gallon of water per minute. Smaller type machines of the type illustrated in FIGS. 10–12 will consume substantially less of both concentrate and water.

We claim:

1. A mobile sweeping machine for cleaning paved areas, industrial type floor surfaces and the like by sweeping and minimizing the raising of dust while doing so, said machine comprising a frame, wheels supporting said frame for movement of said frame evenly over such a surface, foam generating means supported by said frame and movable therewith, foam distributing means positioned adjacent the forward part of said frame and connected to said generating means to receive generated foam therefrom and discharge the same forwardly of said machine in a layer of predetermined width and thickness to cover dust upon said surface in a manner to penetrate and bind said dust particles and thereby effectively stabilize the same to minimize the rising of dust from said surface, a rotatable brush supported by said frame rearwardly of said foam distributing means, and power means connected to said brush and operable to rotate it in a direction to sweep said foam penetrated dust forwardly in a manner to at least somewhat roll up said layer of dust into an accumulated mass.

2. The mobile machine according to claim 1 in which said discharge means is elongated and is supported for pivotal movement about a substantially vertical axis to arrange the discharge of foam at a desired location with respect to a surface upon which a layer of the same is being spread.

3. The mobile machine according to claim 1 in which the power means is an internal combustion engine, and further including means to direct the exhaust gases of such engine into foaming engagement with foam concentrate material to effect generation of said foam.

4. The mobile machine according to claim 1 in which said foam generating means comprises a container for a supply of gas under pressure, a reservoir to contain and deliver foamable material of a type suitable to generate foam, and a reservoir for a supply of liquid to be mixed with said foamable material when intermixed with said gas under pressure, and said machine further including control valve means arranged to be actuated manually by an operator and positioned conveniently to be engaged by such operator for controlling the supply of gas under pressure and liquid and foamable material to effect intermixing thereof to generate foam of a desired consistency.

5. The mobile machine according to claim 4 further including power means carried by said frame and operable to propel said machine along a surface to which foam is to be applied, said machine also including means to accommodate an operator, and said control means being located conveniently for operation by said operator while supported by said machine and propelled therewith.

6. The mobile machine according to claim 4 in which said machine is arranged to be controlled and directed by an operator while walking to the rear of said machine, said machine further including steering handle means projecting substantially rearwardly from the machine for engagement by the operator and said control means for the foam generating mechanism being positioned adjacent said steering handle means for actuation by the operator.

7. The mobile machine according to claim 4 further including means to mix said liquid and foamable material in desired proportions prior to engagement thereof by said gas under pressure.

8. The mobile machine according to claim 4 in which said control valve means comprise a multi-valve unit having a common discharge port and including conduits respectively leading from said reservoirs for said foamable material and liquid and said container for gas under pressure, whereby the valves of said unit may be adjusted to discharge a desired mixture of said ingredients to produce a foam of desired consistency.

9. The sweeping machine according to claim 1 further including baffle means between said foam discharge means and said brush to prevent discharge of foam directly upon said brush while operating.

References Cited

UNITED STATES PATENTS

| | | | |
|---|---|---|---|
| 1,247,054 | 11/1917 | Wollensak | 15—82 |
| 1,286,481 | 12/1918 | Woodin | 15—82 |
| 2,293,722 | 8/1942 | Erickson. | |
| 2,558,590 | 6/1951 | Smith | 15—320 |
| 3,129,890 | 4/1964 | Britton et al. | |
| 3,197,798 | 8/1965 | Brown et al. | 15—320 |

EDWARD L. ROBERTS, *Primary Examiner.*

U.S. Cl. X.R.

15—82; 239—129; 252—359